United States Patent [19]

Katayama et al.

[11] Patent Number: 5,527,850
[45] Date of Patent: Jun. 18, 1996

[54] CONDUCTIVE POLYMER COMPOSITIONS

[75] Inventors: Seizi Katayama, Usui-Gun; Motoo Fukushima; Shigeru Mori, both of Kawasaki, all of Japan

[73] Assignee: Shin-Etsu Chemical Co., Ltd., Tokyo, Japan

[21] Appl. No.: 399,543

[22] Filed: Mar. 7, 1995

[30] Foreign Application Priority Data

Mar. 8, 1994 [JP] Japan .................................. 6-64492

[51] Int. Cl.$^6$ .................................................. C08K 3/10
[52] U.S. Cl. .......................... 524/434; 524/435; 524/588; 252/518
[58] Field of Search .................................. 524/434, 435, 524/588; 252/518

[56] References Cited

U.S. PATENT DOCUMENTS

| | | | |
|---|---|---|---|
| 4,588,801 | 5/1986 | Hanah et al. | 528/25 |
| 5,120,406 | 6/1992 | Shono et al. | 204/59 R |
| 5,362,559 | 11/1994 | Hayase et al. | 525/474 |
| 5,407,987 | 4/1995 | Fukushima et al. | 524/434 |

*Primary Examiner*—Mark D. Sweet
*Attorney, Agent, or Firm*—Millen, White, Zelano & Branigan

[57] ABSTRACT

A polysilane having an aromatic amino group is doped with an oxidative dopant, typically iodine and ferric chloride, to produce a highly conductive polysilane composition having improved shapability. The composition is easily applicable to form a highly conductive film or coating.

10 Claims, No Drawings

CONDUCTIVE POLYMER COMPOSITIONS

BACKGROUND OF THE INVENTION

1. Field of the Invention

This invention relates to a highly conductive polymer composition comprising a doped polysilane having an aromatic amino group in its side chain.

2. Prior Art

Most polysilanes known in the art were those having an alkyl group as typified by methyl or a phenyl group as a substituent. See R. West el al., J. Am. Chem. Soc., 103, 7352 (1981). Thereafter synthesized were polysilanes having a hydrogen atom as a substituent or a substituent containing a reactive carbon-to-carbon double bond and polysilanes having a halogenated alkyl group. Since it became possible to crosslink polysilanes, further application of polysilanes was expected. See R. West et al., J. Organomet. Chem., 300, 327 (1986).

Recently proposed were polysilanes having a silyl group introduced as a substituent (JP-A 12636/1988). It was also proposed to introduce a phenolic substituent into polysilanes in order to apply them as resist material (JP-A 113021/1988). Paying attention to the photoconductivity and conductivity of polysilanes, the same assignee as the present invention proposed to introduce a carbazolyl group-containing substituent into a polysilane to restrain the photo-decomposition thereof (JP-A 43702/1993).

However, polysilanes which are doped generally become electroconductive, but not to a sufficient extent. There is a desire to have a conductive polymer composition comprising a polysilane which is doped so as to exhibit high conductivity.

SUMMARY OF THE INVENTION

We have found that a highly conductive polymer is obtained by a polysilane having an aromatic amino group as a substituent with a dopant, typically iodine or ferric chloride which are easy to handle.

More particularly, an aromatic amino group-containing polysilane of the following general formula (1) is synthesized, for example, by reacting an aromatic amino group-containing dihalogenosilane of the following general formula (2) with a halogenosilane of the following general formula (3) or (4) in an inert solvent in the presence of an alkali metal. High conductivity and shapability is obtained by the aromatic amino group-containing polysilane of formula (1) which is doped with a dopant, typically iodine and ferric chloride.

$$R^1R^2SiX_2 + R_c^4SiX_{4-c} \text{ or } X_{4-d}SiR_d^5\text{—Ar—}SiR_d^6X_{4-d} \quad (1)$$
$$(2) \quad (3) \quad (4)$$

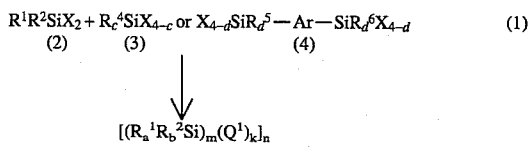

$[(R_a^1R_b^2Si)_m(Q^1)_k]_n$

In the formula, $R^1$ is a monovalent organic group containing an aromatic amino group represented by the formula: $R^3$—$C_pH_{2p+1}$ wherein $R^3$ is an aromatic amino-containing group and $1 \leq p \leq 8$, $R^2$ is a hydrogen atom, a monovalent substituted or unsubstituted hydrocarbon group having 1 to 18 carbon atoms, or $R^1$, letters a and b are numbers satisfying $0.01 \leq a \leq 2$ and $a+b=2$, $Q^1$ is $R_c^4Si$ or $SiR_d^5$—Ar—$SiR_d^6$ wherein $R^4$ is an aryl group having 6 to 10 carbon atoms, each of $R^5$ and $R^6$ is a hydrogen atom or a monovalent substituted or unsubstituted hydrocarbon group having 1 to 18 carbon atoms, Ar is an arylene group having 6 to 10 carbon atoms, and each of c and d is 1 or 2, letters k and m are numbers satisfying $0 \leq k < 1$, $0 < m \leq 1$, $k+m=1$, and n is an integer of at least 6, X is a halogen atom.

For example, when doped with iodine, polysilanes of formula (1) have a conductivity of about $10^{-5}$ to $10^{-2}$ S/cm, which is significantly superior to aromatic amino group-free dibutylpolysilane and methylphenylpoly-silane which have a conductivity of $3.5 \times 10^{-8}$ S/cm and $1.3 \times 10^{-6}$ S/cm, respectively.

From the past, polysilanes are interesting polymers because of the metallic nature and electron delocalization of silicon as compared with carbon, high heat resistance, flexibility, and good thin film formability. Highly conductive polysilanes are not known in the art. West et. al. succeeded in producing highly conductive polymers by the polysilastyrene polymers which were doped with fluorine compounds such as $SbF_5$ or $AsF_5$ (R. West, et. al., J. Am. Chem. Soc., 103, 7352 (1981)), but the dopants used therein were strongly toxic and cumbersome to handle. In contrast, according to the present invention, a highly conductive and easily shapable polymer is obtained by the polysilane doped with iodine or ferric chloride which are safe and easy to handle. From the doped polysilane, highly conductive films or coatings can be easily formed. Therefore the conductive polysilane can be a useful stock material which is applicable to battery electrodes, solar battery and electromagnetic shield casings.

Accordingly, the present invention provides a conductive polymer composition comprising a polysilane of formula (1) doped with an oxidative dopant.

DETAILED DESCRIPTION OF THE INVENTION

The aromatic amino group-containing polysilane used in the present invention is represented by the following general formula (1).

$[(R_a^1R_b^2Si)_m(Q^1)_k]_n \qquad (1)$

In formula (1), $R^1$ is a monovalent organic group containing an aromatic amino group represented by the formula: $R^3$—$C_pH_{2p+1}$ wherein $R^3$ is an aromatic amino-containing group and $1 \leq p \leq 8$, $R^2$ is a hydrogen atom, a monovalent substituted or unsubstituted hydrocarbon group having 1 to 18 carbon atoms, or $R^1$, letters a and b are numbers satisfying $0.01 \leq a \leq 2$ and $a+b=2$, $Q^1$ is $R_c^4Si$ or $SiR_d^5$—Ar—$SiR_d^6$ wherein $R^4$ is an aryl group having 6 to 10 carbon atoms, each of $R^5$ and $R^6$ is a hydrogen atom or a monovalent substituted or unsubstituted hydrocarbon group having 1 to 14 carbon atoms, Ar is an arylene group having 6 to 10 carbon atoms, and each of c and d is 1 or 2, letters k and m are numbers satisfying $0 \leq k < 1$, $0 < m \leq 1$, $k+m=1$, and n is an integer of at least 6.

The aromatic amino-containing group represented by $R^3$ is preferably selected from the following two groups.

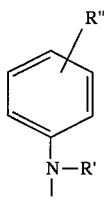

In the formulae, each of R, R' and R" is a hydrogen atom or a monovalent substituted or unsubstituted hydrocarbon group having 1 to 20 carbon atoms.

The monovalent substituted or unsubstituted hydrocarbon groups represented by R, R' and R" are preferably those having 1 to 20 carbon atoms, more preferably 1 to 18 carbon atoms, for example, alkyl groups such as methyl, ethyl, propyl and hexyl, aryl groups such as phenyl and alkyl-substituted phenyl, aralkyl groups such as benzyl and phenethyl, and cycloalkyl groups such as cyclohexyl. R, R' and R" may be identical or different.

Examples of the aromatic amino-containing group represented by $R^3$ include 4-(N,N-dimethylamino)phenyl, 3-(N,N-dimethylamino)-phenyl, 4-(N,N-diethylamino)phenyl, 4-(N,N-diphenylamino)phenyl, N-phenylamino, N-phenyl-N-methylamino, N-phenyl-N-ethyl-amino, N,N-diphenylamino, N-methyl-N-(4-diphenyl)amino, and N-methyl-N-(4-methylphenyl)amino groups.

Letter p is an integer of 1 to 8, preferably 1 to 6.

The monovalent hydrocarbon groups, represented by $R^2$ are the same as those described for R, R' and R".

Letters a and b are as defined above, preferably $0.1 \leq a \leq 2$, more preferably $1 \leq a \leq 2$.

$Q^1$ is $R_c^4 Si$ or $SiR_d^5$—Ar—$SiR_d^6$. $R^4$ is an aryl group having 6 to 10 carbon atoms such as phenyl and alkyl-substituted phenyl groups. Each of $R^5$ and $R^6$ is a hydrogen atom or a monovalent substituted or unsubstituted hydrocarbon group having 1 to 18 carbon atoms, preferably 1 to 17 carbon atoms, for example, alkyl groups such as methyl, ethyl, propyl, butyl and hexyl, aryl groups such as phenyl, substituted aryl groups such as alkyl-substituted phenyl, cycloalkyl groups such as cyclohexyl, and aralkyl groups such as benzyl. Preferably at least one of $R^5$ groups and $R^6$ groups is an aryl group having 6 to 10 carbon atoms as defined for $R^3$. Ar is an arylene group having 6 to 10 carbon atoms, such as phenylene. When Ar is phenylene, for example, $SiR_d^5$ may be at o-, m- or p-position to $SiR_d^5$. Each of c and d is 1 or 2.

Letters k and m are numbers satisfying $0 \leq k < 1$, $0 < m \leq 1$, $k+m=1$, preferably $0.05 < m \leq 1$.

Letters n is an integer of at least 6, preferably at least 10. The upper limit of n is usually 1,000,000.

The polysilanes of formula (1) preferably have a weight average molecular weight of 500 to 10,000,000, more preferably 1,000 to 5,000,000, most preferably 3,000 to 1,000,000, in order that they exert their function to a maximum extent.

The polysilane of formula (1) can be prepared by reacting an aromatic amino group-containing dihalogenosilane of the following general formula (3) and a halogenosilane of the following general formula (4) or (5) with an alkali metal in an inert solvent.

In the formulae, $R^1$, $R^2$, $R^4$, $R^5$, $R^6$, Ar, c, and d are as defined above, and X is a halogen atom, preferably chlorine atom.

The aromatic amino group-containing halosilanes of formula (3) may be of either mono- or di-substituted type. When a dihalosilane is used as the halosilane of formula (4) or (5), a linear or cyclic polymer is formed. When a trifunctional trihalosilane is used as the halosilane of formula (4) or (5), a network polysilane can be formed. Exemplary trihalosilanes are aryltrihalosilanes such as phenyltrihalosilanes. Examples of the halosilane previously containing a carbon-to-carbon unsaturated bond in a backbone skeleton include o-, m- or p-substituted bis(halophenylmethylsilyl)benzene, bis(halodimethyl-silyl)benzene, and bis(halophenylmethylsilyl)xylene.

The halosilanes are reacted in an inert solvent. Examples of the solvent used herein include alkanes such as hexane, octane, isooctane, and decane, aromatic solvents such as benzene, toluene, xylene and decalin, and ether solvents such as diethyl ether, tetrahydrofuran, 1,2-dimethoxyethane, and diethylene glycol diethyl ether, alone or in admixture of two or more. The inert solvent is preferably used in such an amount as to give a halosilane concentration of 0.05 to 4 mol/l, more preferably 0.2 to 2.5 mol/l.

Sodium is the preferred alkali metal. It is used in such an amount that at least 1 mol, preferably 1.0 to 2.5 mol of sodium is available per mol of halogen in the halosilane reactants.

It is recommended to carry out reaction in an inert atmosphere such as nitrogen atmosphere. One preferred process involves adding an inert solvent to an alkali metal to form an alkali metal dispersion, and then adding halosilanes to the dispersion. Preferred reaction conditions include a temperature of 0° to 250° C., especially 60° to 200° C. and a time of 0.1 to 20 hours, especially 0.5 to 10 hours.

After the completion of reaction, the reaction product is isolated by deactivating the residual alkali metal in a conventional manner, and adding methanol to the reaction solution to precipitate the reaction product from the inert solvent.

The conductive polymer composition of the present invention is comprised of the polysilane of formula (1) doped with an oxidative dopant. The polysilanes of formula (1) are insulating materials as such. When doped with oxidative dopants, they can be converted into highly conductive materials which can maintain high conductivity in a stable manner.

The oxidative dopants for rendering the aromatic amino group-containing polysilanes of formula (1) electrically conductive include halogens such as chlorine, bromine and iodine, transition metal chlorides such as tin chloride and ferric chloride, and Lewis acids such as $SbF_5$ and $AsF_5$. Because of safety and ease of handling, iodine and ferric chloride are preferred dopants. The polysilane is doped with the oxidative dopant by (1) a gas phase or dry doping technique of exposing the polymer to an atmosphere of dopant vapor, (2) a wet doping technique of immersing the polymer in a solution of the dopant in an inert solvent, or (3)

a co-doping technique wherein provided that the polymer is soluble in a solution of the dopant, the resulting solution is applied and dried to shape a film or coating while doping takes place simultaneously.

Inert solvents are used in the wet doping technique (2) or co-doping technique (3). These solvents should be inert in a sense that they do not react with the dopant such as iodine or ferric chloride to lose its ability as an electron acceptor. That is, the solvents should not deactivate the dopant. Exemplary inert solvents include hydrocarbon solvents such as hexane, octane and cyclohexane; aromatic solvents such as toluene, xylene and nitrobenzene; ethers such as ether and tetrahydrofuran; aprotic polar solvents such as dimethylformamide, dimethylsulfoxide, and hexamethylphosphoric triamide; nitromethane, acetonitrile, etc. Among others, such solvents as tetrahydrofuran are preferred especially for use in the co-doping technique because the polymer is well soluble therein. This technique involves dissolving the polymer in a solution of the dopant, casting the solution, and drying the coating to produce a doped conductor. The coating is preferably dried at a temperature of 0° to 150° C. under atmospheric or reduced pressure.

However, the wet technique or co-doping technique have a fear that the polymer be gelled or decomposed due to degradation by the dopant. If such inconvenience should be avoided, the gas phase doping technique (1) is especially useful because it affords high conductivity through easy operation without a solvent.

The gas phase doping technique is able to control a doping rate by controlling the temperature and pressure of the dopant. In general, a temperature of −30° C. to 200° C. is employed. Lower temperature would retard the doping whereas higher temperatures would cause deterioration of the polymer which is doped. The pressure of the dopant is preferably in the range of from 0.001 mmHg to 5 atm. Lower pressures would retard the doping whereas higher pressures would no longer increase the doping rate. In the case of iodine dopant, prompt doping takes place at room temperature and atmospheric pressure. In the case of ferric chloride dopant, the doping conditions are different from those of iodine because the vapor pressure of ferric chloride is lower. The doping temperature by ferric chloride is preferably at 50° to 300° C. Lower temperatures would retard the doping whereas higher temperatures would cause deterioration of the polymer which is doped. Additionally the doping is preferably carried out in a pressure of 0.001 mmHg to 1 atm. Lower pressures are not economical because it takes a long time until the pressure is reached. Higher pressures would result in a very slow doping rate because ferric chloride has a boiling point of 319° C. at atmospheric pressure. More preferably the pressure of ferric chloride should range from 0.1 to 10 mmHg for the purpose of effectively increasing the conductivity of the polymer while the temperature should be in the range of 50° to 200° C. This technique permits a conductive polymer to be manufactured by a very simple procedure using a least toxic ferric chloride without flammable solvent.

EXAMPLE

Examples of the invention are given below by way of illustration and not by way of limitation.

Synthesis Example 1

Synthesis of $[(MePhSi)_{0.5}(4-N,N-Me_2N-C_6H_4-(CH_2)_3-SiMe)_{0.5}]_n$

In a nitrogen atmosphere, 20 ml of n-decane was added to 0.7 g (30 mmol) of metallic sodium. With vigorous stirring, the mixture was heated to 120° C. to achieve dispersion.

To the dispersion, 80 ml of a decane solution containing 1.16 g (6 mmol) of 3-(4-(N,N-dimethylamino)phenyl)propylmethyldichlorosilane and 1.15 g (6 mmol) of methylphenyldichlorosilane was added over 15 minutes. The reaction mixture was agitated for 5 hours at 171° C. After the completion of reaction, the reaction mixture was cooled down to room temperature. The residual sodium was deactivated by adding 100 ml of toluene containing 1 g of trimethylchlorosilane. The reaction mixture was subject to hydrolysis under ice cooling and washed with water. The organic layer was collected, dried over sodium sulfate, and then concentrated. The resulting viscous fluid was added to 250 ml of methanol, from which a polymer precipitated. The precipitate was removed by filtration and dried in vacuum, obtaining 0.3 g of an end product as a white precipitate. The end product was a dimethyl-anilino group-containing polysilane of the following formula. On GPC analysis, the polymer had a weight average molecular weight of 13,000 calculated on polystyrene. A UV absorption peak (λ max 338 nm) attributable to polysilane was observed.

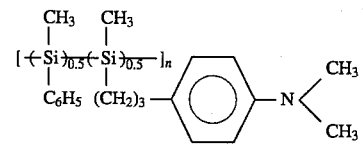

Synthesis Example 2

The same procedure as Synthesis Example 1 was repeated except that 2 mmol of 3-(4 -(N,N-dimethylamino)phenyl)propylmethyldichlorosilane and 8 mmol of methylphenyldichlorosilane were used, yielding a polysilane of the following formula having a weight average molecular weight of 51,000.

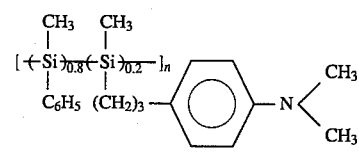

Synthesis Example 3

The same procedure as Synthesis Example 1 was repeated except that 1 mmol of 3-(4 -(N,N-dimethylamino)phenyl)propylmethyldichlorosilane and 9 mmol of methylphenyldichlorosilane were used, yielding a polysilane of the following formula having a weight average molecular weight of 74,000.

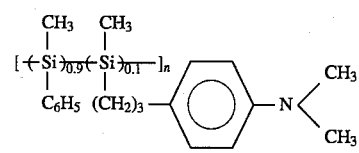

Synthesis Example 4

The same procedure as Synthesis Example 1 was repeated except that 6 mmol of 3-(4 -(N,N-dimethylamino)phenyl)propylmethyldichlorosilane was used and 6 mmol of phenyltrichlorosilane was used instead of the methylphenyldichlorosilane, yielding a polysilane of the following formula having a weight average molecular weight of 6,600.

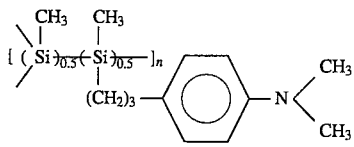

Synthesis Example 5

The same procedure as Synthesis Example 1 was repeated except that 6 mmol of 3-(4 -(N,N-dimethylamino)phenyl-)propylmethyldichlorosilane was used and 6 mmol of a chlorosilane $Cl(C_6H_5)(CH_3)Si$—$C_6H_4$—$Si(C_6H_5)(CH_3)Cl$ was used instead of the methylphenyldichlorosilane, yielding a polysilane of the following formula having a weight average molecular weight of 22,000.

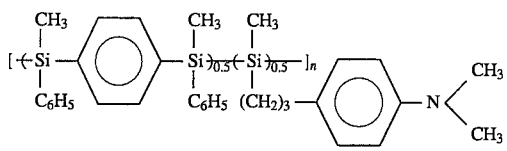

Synthesis Example 6

Synthesis of
$[(MePhSi)_{0.8}(C_6H_5$—$N(CH_3)$—$(CH_2)_3$—$SiMe)_{0.2}]_n$

In a nitrogen atmosphere, 20 ml of n-decane was added to 1.10 g (40 mmol) of metallic sodium. With vigorous stirring, the mixture was heated to 120° C. to achieve dispersion.

To the dispersion, 80 ml of a decane solution containing 1.05 g (4 mmol) of 3-(N-methyl-N-phenylamino)propylmethyldichlorosilane and 3.05 g (16 mmol) of methylphenyldichlorosilane was added over 30 minutes. The reaction mixture was agitated for 10 hours at 171° C. After the completion of reaction, the reaction mixture was cooled down to room temperature. The residual sodium was deactivated by adding 100 ml of toluene containing 1 g of trimethylchlorosilane. The reaction mixture was subject to hydrolysis under ice cooling and washed with water. The organic layer was collected, dried over sodium sulfate, and then concentrated. The resulting viscous fluid was added to 30 ml of methanol, from which a polymer precipitated. The precipitate was removed by filtration and dried in vacuum, obtaining 1.4 g of an end product as a white precipitate. The end product was an anilino group-containing polysilane of the following formula. On GPC analysis, the polymer had a weight average molecular weight of 58,000 calculated on polystyrene. A UV absorption peak (λ max 335 nm) attributable to polysilane was observed.

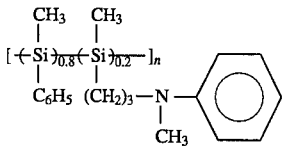

Example 1

The aromatic amino group-containing polysiloxanes of Synthesis Examples 1 to 6 were doped with iodine and measured for electric conductivity. The results are shown in Table 1. For comparison purposes, the results of dibutylpolysilane $(Bu_2Si)_n$ and methylphenylpolysilane $(MePhSi)_n$ are also shown in Table 1 as Comparative Examples 1 and 2.

Conductivity was measured by depositing platinum on a glass plate to form four terminals thereon to construct an electrode, and spin coating a solution of a polymer in a solvent onto the electrode to form a thin film thereon, obtaining a sample for conductivity measurement. In a light shielded, sealed state, the sample was placed in contact with iodine. The DC resistance of the sample was measured to determine a change thereof with time. Conductivity was calculated from the resistance value which reached a steady value at room temperature (25° C.).

TABLE 1

| Polysilane | Molecular weight | Conductivity (S/cm) |
|---|---|---|
| Synthesis Example 1 | 13,000 | $7.0 \times 10^{-3}$ |
| Synthesis Example 2 | 51,000 | $8.0 \times 10^{-4}$ |
| Synthesis Example 3 | 74,000 | $7.0 \times 10^{-5}$ |
| Synthesis Example 4 | 6,600 | $1.0 \times 10^{-3}$ |
| Synthesis Example 5 | 22,000 | $5.0 \times 10^{-3}$ |
| Synthesis Example 6 | 58,000 | $8.0 \times 10^{-4}$ |
| CE 1: $(Bu_2Si)_n$ | 650,000 | $3.5 \times 10^{-8}$ |
| CE 2: $(MePhSi)_n$ | 46,000 | $1.3 \times 10^{-6}$ |

Example 2 & Comparative Example 3

A conductivity measurement sample prepared as in Example 1 using the polymer of Synthesis Example 1 was mounted in a dry brown glass bottle which was charged with solid ferric chloride at the bottom. After sealing, the bottle was allowed to stand and then connected to a vacuum pump for evacuating to a vacuum of 4 mmHg. The bottle bottom where the ferric chloride rested was heated by means of a mantle heater. By this procedure, the sample turned from transparent to black brown and showed a rapid conductivity rise. The conductivity eventually reached a constant value and by this time, the temperature of the sample rose to 150° C. At this point, the vacuum pump was interrupted, the heater was removed, and the bottle was allowed to cool down to 25° C. In this normal condition, the conductivity was $7.4 \times 10^{-4}$ S/cm. For comparison purpose, a sample of dibutylpolysilane $(Bu_2Si)_n$ was similarly tested to find a conductivity of $2.2 \times 10^{-10}$ S/cm.

As mentioned above, polysilane containing an aromatic amino group as a substituent are soluble in solvents and can be formed into films or coatings of any desired shape. By doping them with oxidative dopants, highly conductive polymers can be obtained without embrittlement. The conductive polymers remain flexible. According to the present invention, a polysilane having an aromatic amino group is doped with an oxidative dopant, typically iodine or ferric chloride, to produce a highly conductive polysilane composition having improved shapability. The composition is easily applicable to form a highly conductive film or coating having improved shapability. It is a useful stock material which may find use in battery electrodes, solar battery and electromagnetic shield casings and the like. It can be widely used in electric, electronic and communication fields.

Japanese Patent Application No. 6-64492 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A conductive polymer composition comprising an aromatic amino group-containing polysilane or the following general formula:

$$[(R^1_a R^2_b Si)_m (Q^1)_k]_n \quad (1)$$

wherein $R^1$ is a monovalent organic group containing an aromatic amino group represented by the formula: $R^3-C_pH_{2p+1}$ wherein $R^3$ is an aromatic amino-containing group and $1 \leq p \leq 8$, $R^2$ is a hydrogen atom, a monovalent unsubstituted hydrocarbon group having 1 to 18 carbon atoms, or $R^1$, letters a and b are numbers satisfying $0.01 \leq a \leq 2$ and $a+b=2$, $Q^1$ is $R^4_c Si$ or $SiR^5_d-Ar-SiR^6_d$ wherein $R^4$ is an aryl group having 6 to 10 carbon atoms, each of $R^5$ and $R^6$ is a hydrogen atom or a monovalent unsubstituted hydrocarbon group having 1 to 18 carbon atoms, Ar is an arylene group having 6 to 10 carbon atoms, and each of c and d is 1 or 2, letters k and m are numbers satsifying $0 \leq k<1$, $0,<m \leq 1$, $k+m=1$, and n is an integer of at least 6, said polysilane being doped with an oxidative dopant.

2. The composition of claim 1 wherein the aromatic amino-containing group represented by $R^3$ is

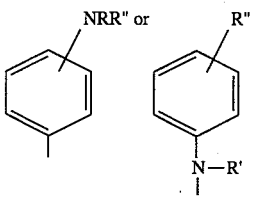

wherein each of R, R' and R" is a hydrogen atom or a monovalent unsubstituted hydrocarbon atom having 1 to 14 carbon atoms.

3. The composition of claim 1 wherein said oxidative dopant is iodine or ferric chloride.

4. The composition of claim 2, wherein each of R, R' and R" is independently a hydrogen atom or a hydrocarbon group selected from the group consisting of methyl, ethyl, propyl, hexyl, phenyl, alkyl phenyl, benzyl, phenethyl and cyclohexyl.

5. A composition as in claim 1, wherein $R^3$ is selected from the group consisting of 4-(N,N-dimethylamino)phenyl, 3-(N,N-dimethylamino)-phenyl, 4-(N,N-diethylamino)phenyl, 4-(N,N-diphenylamino)phenyl, N-phenylamino, N-phenyl-N-methylamino, N-phenyl-N-ethyl-amino, N,N-diphenylamino, N-methyl-N-(4-diphenyl)amino, and N-methyl-N-(4-methylphenyl)amino groups.

6. The composition as in claim 1, wherein each of $R^5$ and $R^6$ is a hydrogen atom or a hydrocarbon group selected from the group consisting of methyl, ethyl, propyl, butyl, hexyl, phenyl, cyclohexyl and benzyl.

7. The composition as in claim 1, wherein Ar is phenylene.

8. A conductive composition comprising a polysilane selected from the group consisting of

[(MePhSi)$_{0.5}$(4-Me$_2$N—C$_6$H$_4$—(CH$_2$)$_3$—SiMe)$_{0.5}$]$_n$

[(MePhSi)$_{0.9}$(4-Me$_2$N—C$_6$H$_4$—(CH$_2$)$_3$—SiMe)$_{0.1}$]$_n$

[(MePhSi)$_{0.8}$(4-Me$_2$N—C$_6$H$_4$—(CH$_2$)$_3$—SiMe)$_{0.2}$]$_n$

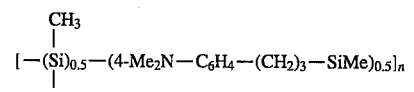

[(MePhSi)$_{0.8}$(C$_6$H$_5$)—N(CH$_3$)—(CH$_2$)$_3$—SiMe)$_{0.2}$]$_n$ and said polysilane being doped wiht an oxidation dopant.

9. A conductive polymer composition comprising an aromatic amino group-containing polysilane of the following general formula:

$$[(R^1_a R^2_b Si)_m (Q^1)_k]_n \quad (1)$$

wherein $R^1$ is a monovalent organic group containing an aromatic amino group represented by the formula: $R^3-C_pH_{2p+1}$ wherein $R^3$ is an aromatic amino-containing group and $1 \leq p \leq 8$, $R^2$ is a hydrogen atom, a monovalent hydrocarbon group having 1 to 18 carbon atoms, or $R^1$, letters a and b are numbers satisfying $0.01 \leq a \leq 2$ and $a+b=2$, $Q^1$ is $R^4_c Si$ or $SiR^5_d-Ar-SiR^6_d$ wherein $R^4$ is an aryl group having 6 to 10 carbon atoms, each of $R^5$ and $R^6$ is a hydrogen atom or a monovalent hydrocarbon group having 1 to 18 carbon atoms, Ar is an arylene group having 6 to 10 carbon atoms, and each of c and d is 1 or 2, letters k and m are numbers satisfying $0 \leq k<1$, $0<m \leq 1$, $k+m=1$, and n is an integer of at least 6, said polysilane being doped with an oxidative dopant.

10. The composition of claim 9, wherein the aromatic amino-containing group represented by $R^3$ is

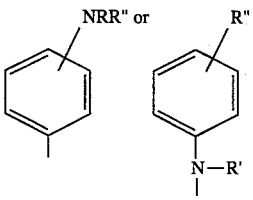

wherein each of R, R' and R" is a hydrogen atom or a monovalent hydrocarbon group having 1 to 14 carbon atoms.

* * * * *